No. 749,545. PATENTED JAN. 12, 1904.
J. P. FABER.
SPEED WAGON.
APPLICATION FILED SEPT. 9, 1902.
NO MODEL. 2 SHEETS—SHEET 1.

WITNESSES:
H. R. Selden.
J. C. Culver

INVENTOR
John P. Faber,
BY Geo. B. Selden,
Attorney

No. 749,545. PATENTED JAN. 12, 1904.
J. P. FABER.
SPEED WAGON.
APPLICATION FILED SEPT. 9, 1902.
NO MODEL. 2 SHEETS—SHEET 2.

WITNESSES:
H. R. Selden.
J. C. Culver.

INVENTOR
John P. Faber,
BY Geo. B. Selden,
Attorney

No. 749,545.

Patented January 12, 1904.

UNITED STATES PATENT OFFICE.

JOHN P. FABER, OF ROCHESTER, NEW YORK, ASSIGNOR, BY MESNE ASSIGNMENTS, TO THE FABER SULKY CO., OF ROCHESTER, NEW YORK, A CORPORATION OF NEW YORK.

SPEED-WAGON.

SPECIFICATION forming part of Letters Patent No. 749,545, dated January 12, 1904.

Application filed September 9, 1902. Serial No. 122,746. (No model.)

*To all whom it may concern:*

Be it known that I, JOHN P. FABER, a citizen of the United States, residing at Rochester, in the county of Monroe and State of New York, have invented an Improvement in Speed-Wagons, of which the following is a specification, reference being had to the accompanying drawings.

My invention relates to certain improvements in speed-wagons, which improvements are fully described and illustrated in the following specification and the accompanying drawings, the novel features thereof being specified in the claims annexed to the said specification.

Figure 1:
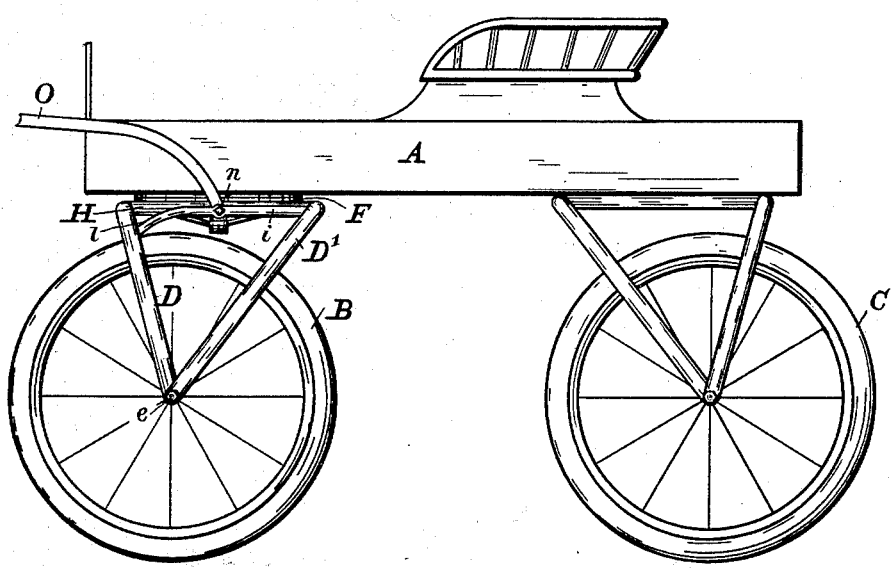
Figure 2:
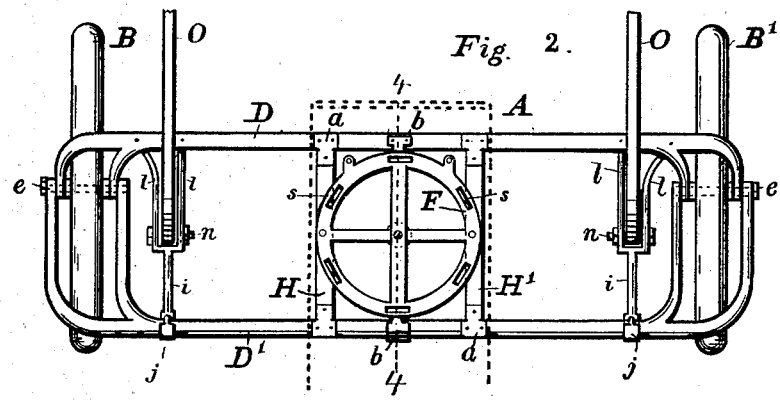
Figure 3:
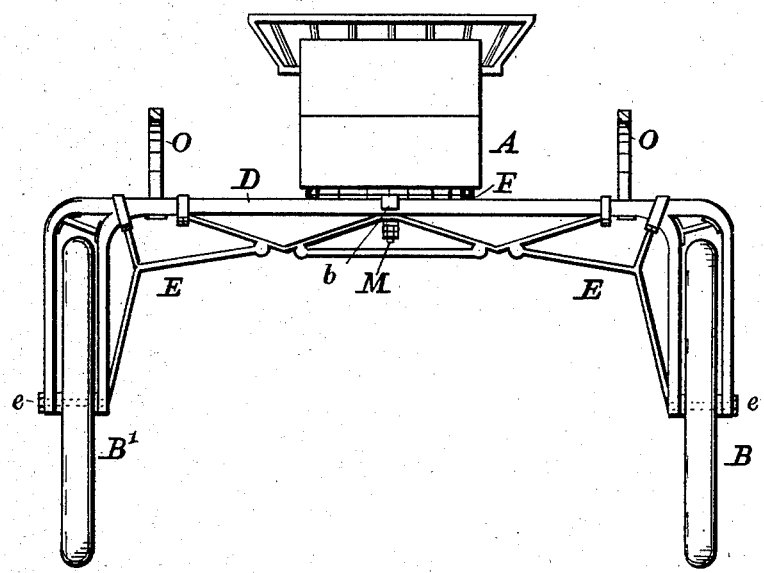

In the accompanying drawings, Figure 1 is a side elevation. Fig. 2 is a plan view of the front axle and fifth-wheel. Fig. 3 is a front elevation.

A represents the body, B B' the front wheels, and C the rear wheels. The front axle consists of the two inclined trusses D D', preferably made of bent wood and stiffened by any suitable metallic bracing E, as indicated in Fig. 3.

F is the lower or movable member of the fifth-wheel, which is attached to the front truss-axle at its sides by the bars H H', preferably of wood, secured to the trusses by the clips $a$. The wheels run on pins or axles $e$, supported at both their inner and outer ends by the downwardly-bent arms of the trusses, as shown. The upper or stationary member of the fifth-wheel is attached to the bottom of the body A in any suitable manner.

M is the king-bolt.

On each side of the body the thills O are pivoted to the braces $i$, attached at their ends to the trusses D D'. As shown, these braces consist of a rear portion attached to the rear truss D' by the clip $j$ and the bifurcated front portion $l$, secured by bolts or clips to the front truss D. $n$ represents pivot-bolts by which the thills are attached to the braces $i$.

It will be observed from Fig. 2 that the thill-pivots $n$ are located in the rear of a transverse line passing through the centers of the front wheels. This arrangement steadies and guides the wagon when at high speed, as the pull of the driver on the reins pushes backward on the thills and presses the rear part of the body and the rear wheels downward against the road, preventing any upward tendency or lateral swaying. By this construction it is impossible for the driver to lift the hind wheels from the ground by pulling on the bit. The harder the pull the greater the downward pressure on the rear wheels. This is a most important feature, as it insures steady running and makes my improved speed-wagon absolutely safe in any emergency. In ordinary wagons the driver is unable to control his horse for the reason that if it becomes necessary to pull him up sharp the rear of the wagon rises up and the driver must relax his pull, a condition which may subject the driver to serious accident.

I claim—

1. In a speed-wagon, the combination of the body, front and rear wheels, supports located between the body and the front and rear wheels respectively, and thills attached to the front supports in a plane located in the rear of the axles of the front wheels, whereby a strong pull upon the reins will not lift the rear wheels off the ground, substantially as described.

2. The combination with the body and rear wheels, of the front axle consisting of the inclined trusses, the fifth-wheel attached thereto, the braces between the trusses and the thills pivoted to the braces in rear of the center of the front wheels, as and for the purposes described.

JOHN P. FABER.

Witnesses:
 GEO. B. SELDEN,
 C. T. WOODRUFF.